US011212341B2

(12) United States Patent
Bacher et al.

(10) Patent No.: US 11,212,341 B2
(45) Date of Patent: *Dec. 28, 2021

(54) DEPLOYMENT MANAGEMENT OF COMPOSITE APPLICATIONS (71) Applicant: INTERNATIONAL BUSINESS MACHINES CORPORATION, Armonk, NY (US)

(72) Inventors: Utz Bacher, Dettenhausen (DE); Einar Lueck, Stuttgart (DE); Stefan Raspl, Bondorf (DE); Thomas Spatzier, Holzgerlingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 212 days.

This patent is subject to a terminal disclaimer.

(21) Appl. No.: 16/744,780

(22) Filed: Jan. 16, 2020

(65) Prior Publication Data
US 2020/0153893 A1  May 14, 2020

Related U.S. Application Data (63) Continuation of application No. 15/833,247, filed on Dec. 6, 2017, now Pat. No. 10,581,955, which is a (Continued)

(30) Foreign Application Priority Data

Oct. 8, 2014 (GB) ..................................... 1417780

(51) Int. Cl.
H04L 29/08 (2006.01)
G06F 8/60 (2018.01)

(52) U.S. Cl.
CPC ................ *H04L 67/10* (2013.01); *G06F 8/60* (2013.01)

(58) Field of Classification Search
CPC .................................. H04L 67/10; G06F 8/60
See application file for complete search history.

(56) References Cited

U.S. PATENT DOCUMENTS 6,986,135 B2  1/2006  Leathers et al.
8,291,378 B2  10/2012 Arnold et al.
(Continued)

FOREIGN PATENT DOCUMENTS

WO  WO2013184134  12/2013

OTHER PUBLICATIONS

Search Report for GB1417780.2 dated Mar. 4, 2015, pp. 1-3.
(Continued)

Primary Examiner — Philip J Chea
Assistant Examiner — Wuji Chen
(74) Attorney, Agent, or Firm — Michael O'Keefe, Esq.; Blanche E. Schiller, Esq.; Heslin Rothenberg Farley & Mesiti P.C.

(57) ABSTRACT

A source IT-infrastructure hosts a composite application including multiple functional modules connected to each other via communication links. An abstract pattern includes first nodes and first links representing the functional modules and communication links and lacks resource-related data enabling a deployment engine to instantiate a resource for providing a runtime environment. A target IT-infrastructure has assigned a resource catalog including, for each resource available in the target IT-infrastructure, a specification of the resource's capabilities, and includes second nodes and links, each second node being a representation of one or more of the resources of the target IT-infrastructure and including an indication of the capabilities of one or more (Continued)

resources represented by the second node. The first nodes and links of the abstract pattern are iteratively supplemented by the second nodes and second links.

20 Claims, 3 Drawing Sheets

Related U.S. Application Data continuation of application No. 14/876,996, filed on Oct. 7, 2015, now Pat. No. 9,967,325.

(56) References Cited

U.S. PATENT DOCUMENTS

| | | | |
|---|---|---|---|
| 8,301,746 B2 | 10/2012 | Head et al. | |
| 8,417,658 B2 | 4/2013 | Arnold et al. | |
| 9,286,037 B2* | 3/2016 | Winkler | G06F 8/33 |
| 9,678,805 B2* | 6/2017 | Kotton | G06F 9/5083 |
| 9,967,325 B2 | 5/2018 | Bacher et al. | |
| 10,025,579 B1* | 7/2018 | Behl | G06F 8/65 |
| 2003/0051236 A1* | 3/2003 | Pace | H04L 67/34 |
| | | | 717/177 |
| 2007/0220586 A1* | 9/2007 | Salazar | G06N 3/126 |
| | | | 726/1 |
| 2009/0157872 A1* | 6/2009 | Pinkston | G06F 9/546 |
| | | | 709/224 |
| 2009/0249296 A1* | 10/2009 | Haenel | G06F 9/44536 |
| | | | 717/120 |
| 2010/0042986 A1 | 2/2010 | Greiner et al. | |
| 2010/0070449 A1* | 3/2010 | Arnold | G06N 5/02 |
| | | | 706/48 |
| 2011/0029967 A1 | 2/2011 | Berg et al. | |
| 2012/0102486 A1 | 4/2012 | Yendluri | |
| 2012/0174058 A1* | 7/2012 | Winkler | G06F 8/36 |
| | | | 717/105 |
| 2014/0156846 A1* | 6/2014 | Stern | H04L 41/0668 |
| | | | 709/226 |
| 2014/0365662 A1* | 12/2014 | Dave | G06Q 30/02 |
| | | | 709/226 |
| 2016/0105493 A1 | 4/2016 | Bacher et al. | |
| 2018/0109593 A1 | 4/2018 | Bacher et al. | |

OTHER PUBLICATIONS

Lu, Hongbin et al., "Pattern-Based Deployment Service for Next Generation Clouds," 2013 IEEE Ninth World Congress, Jun. 2013, pp. 464-471.

Arnold, William et al., "Pattern Based SOA Deployment," Sep. 2007, p. 2.

Eilam, Tamer et al., "Pattern-Based Composite Application Deployment," 2011 IFPI/IEEE International Symposium on Integrated Network Management, May 2011, pp. 217-224.

Breitenbucher, Uwe, et al., "Pattern-Based Runtime Management of Composite Cloud Applications," Institute of Architecture of Application Systems, 2013 (no further date information available), pp. 1-9.

* cited by examiner

DEPLOYMENT MANAGEMENT OF COMPOSITE APPLICATIONS

BACKGROUND

One or more aspects of the invention relate to computing systems, and more particularly to the management of the deployment of composite applications.

Deployment environments used for developing or hosting a particular application often differ from the deployment target environment. Thus, deployment architects are often burdened with the task of adapting deployment artifacts, configurations and settings of the application to enable a successful deployment and instantiation of an application in the deployment target environment. Often, the deployment architects do not have first-hand knowledge of the specific characteristics and available resources of specific target deployment environments and also do not know the particular requirements of the application to be deployed. Thus, to enable an automated deployment, detailed information of the deployment target environment is required.

SUMMARY

In accordance with an aspect of the present invention, a computer-implemented method of managing deployment of a composite application is provided. The computer-implemented method includes providing an abstract pattern including a plurality of first nodes connected via one or more first links. A first node represents a functional module of the composite application, and the composite application includes multiple functional modules. A first link represents a communication link of one or more communication links connecting the multiple functional modules. The abstract pattern lacks resource-related data enabling a deployment engine to instantiate one or more selected resources for providing a runtime environment for the multiple functional modules and the one or more communication links. Further, a resource catalog of a target infrastructure is provided. The resource catalog includes: for one or more resources of the target infrastructure, a specification of one or more capabilities of the one or more resources to provide the runtime environment with predefined features; and a plurality of second nodes. A second node is a representation of at least one resource of the one or more of the resources of the target infrastructure and includes an indication of one or more capabilities of the at least one resource represented by the second node. The method further includes iteratively evaluating the resource catalog to supplement at least one first node of the abstract pattern with one or more second nodes of the plurality of second nodes.

Computer program products and computer systems relating to one or more aspects and which may implement the method described above are also described and may be claimed herein.

BRIEF DESCRIPTION OF THE DRAWINGS

In the following, embodiments of the invention will be described in greater detail by way of example only making reference to the drawings in which.

DETAILED DESCRIPTION

A computer implemented method, storage medium and computer system for managing the deployment of a composite application as described herein is provided. Providing an abstract pattern that lacks resource-related data enabling a deployment engine to instantiate the resource may be advantageous, because a deployment architect may be freed of the burden to evaluate in detail what kind of resources are available in a particular target IT-infrastructure ("target ITI") and to evaluate if the available resources are capable of providing a runtime environment for the application that shall be deployed. In particular for complex applications, this may greatly ease the deployment, because the requirements and interdependencies of the functional modules and communication links of a composite application may be highly complex. Thus, a deployment architect may specify a deployment pattern without any reference to a concrete resource. The abstract pattern can be created also in cases when detailed knowledge of the target ITI is not available, e.g. because the IT-infrastructure does not exist yet. The abstract pattern will be filled fully automatically and iteratively with more concrete information on the resources available in a particular target ITI that meet the requirements of the abstract pattern (provided such resources are available in the target ITI). Thus, the deployment architect may specify the abstract pattern even before the target ITI was created and configured. The feature may also greatly increase the flexibility of assembling and configuring the target ITI: in case any changes have to be made in respect to the hardware or middleware infrastructure of the target ITI, it may not be necessary to amend an already defined deployment pattern manually, because the abstract pattern does not comprise any reference to a concrete, instantiable resource. Rather, it may be sufficient to re-execute the automated iterative supplementation of the abstract pattern for automatically including the changes made in the target ITI.

According to embodiments, at least some of the second nodes and links may be incapable of enabling a deployment engine to instantiate the one or more resources represented by the second nodes and second links. At least some other ones of the second nodes and links may be capable of enabling a deployment engine to instantiate the one or more resources represented by the other second nodes and second links. It may be possible to specify second nodes and links, which add additional details and requirements to the intermediate pattern without already limiting the pattern to a concrete resource at this moment. Thus, better and finer grained control of the iterative process of concretizing the pattern may be provided.

According to embodiments, a specification of a resource may comprise sufficient data enabling a deployment engine to instantiate and/or control the resource via an interface of the resource. A second node representing a resource and comprising the specification of the resource may act as a leaf node.

According to embodiments the abstract pattern may lack any reference to and lack configuration data of a concrete hardware, a concrete firmware, a concrete operating system and a concrete middleware component (e.g. a particular web server program or application server program).

According to some embodiments, the method further comprises performing the iterative supplementation for transforming the abstract pattern into an executable concrete pattern. In the concrete pattern, each first node and first link of the abstract pattern is supplemented by one or more of the second nodes, the one or more of the second nodes comprising specifications of one or more of the resources of the target IT-infrastructure which are represented by the one or more second nodes and which meet the requirements having been inherited directly or indirectly from the first nodes and first links. The method further comprises executing the concrete pattern, thereby automatically deploying the functional modules of the composite application in accordance with the concrete pattern to the target ITI. For example, the specifications contained in the second nodes may indicate a path to the resource or to a configuration file of the resource. An automatically executable deployment pattern may be provided. The pattern may be used by a deployment engine for automatically deploying and instantiating the resources required by the composite application and the components of the composite application. For example, the repeated supplementation of the abstract and the intermediate pattern and the evaluation of the abstract pattern and the resource catalog may be performed by a pattern composer. The pattern composer may forward the generated concrete pattern to a deployment engine that uses the concrete pattern for automatically deploying and instantiating the functional modules of the composite applications to the target ITI and for automatically installing and instantiating all resources whose specifications are contained in the concrete pattern and which provide the runtime environment for the composite application.

According to embodiments, the concrete pattern comprises an interface (e.g. an API—application programming interface) for each of the resources of the target ITI. A deployment engine uses the interfaces specified in the concrete pattern to automatically instantiate, start, stop, restart and/or configure one or more of the resources of the target ITI for enabling the automated deployment, instantiation and/or control of the composite application to or in the target ITI. For example, a specification integrated into the concrete pattern may specify an interface for controlling the resource described by the specification. Using interfaces for automated instantiation of (unknown) target ITI resources may allow for automated control of the resources hosting the deployed application and thus may guarantee that the application is constantly available.

According to embodiments, the method further comprises: after having successfully deployed the composite application to the target ITI, receiving a notification that a first one of the resources of the target ITI was replaced or will be replaced by a second one of the resources. The second resource differs from the replaced first resource in one or more of the following features: the version number of the resource, the manufacturer of the resource, the device type number of the resource, the number and/or type of patches having been applied to the resource. The patches may be, for example, firmware and/or hardware patches. The method further includes re-executing the iterative evaluation of the resource catalog and the supplementation operations according to any one of the above embodiments in simulation mode, thereby supplementing at least one of the first nodes with the one of the second nodes representing the second resource instead of supplementing the at least one first node with the one of the second nodes representing the first resource, thereby evaluating if the capabilities indicated by the second node representing the second resource meet the inherited requirements of the at least one first node. If at least one of the requirements is violated, outputting a warning. For example, a user may be notified that the replacement will conflict with requirements of the composite application that was or that will be deployed to the target ITI. This may prevent any problems caused by a real replacement of the first by the second resource. In case the replacement is performed in operation mode, e.g. in case the first resource failed, a warning is issued. This may prevent a situation that the deployed composite application becomes unavailable due to a resource replacement without anyone noticing.

According to embodiments, the re-execution of the iterative evaluation and supplementation operations comprises transforming the abstract pattern into an updated concrete pattern. In the updated concrete pattern, all first nodes and links of the abstract pattern are supplemented by specifications of one or more of the resources available in the target IT-infrastructure and meeting the inherited requirements of the first nodes or links. If none of the requirements is violated, the method comprises automatically replacing the concrete pattern by the updated concrete pattern. For example, the updating and replacing may be executed by the pattern composer. The pattern composer may be a software application or application module. The updated concrete pattern comprises a specification of the second resource, whereby the specification may comprise an interface allowing the deployment engine to control, e.g. to start, stop and restart the second resource automatically without an intervention of a human operator. According to embodiments, the first nodes and second nodes are specified in accordance with an object oriented model that includes inheritance of requirements. In each iteration the one or more second nodes and/or second links used for supplementing the first nodes and links in a current iteration may inherit all requirements assigned to the first nodes and links directly from the first nodes and links or indirectly via other second nodes and links having been used for supplementing the first nodes and links in a previous iteration.

According to embodiments, performing a first one of the iterations for creating a first one of the intermediate patterns from the abstract pattern comprises supplementing at least one first node of the abstract pattern with a second node enabling a deployment engine to instantiate the one or more resources represented by the second node, thereby creating a link between the at least one first node and the second node. Thus, the first intermediate pattern may have a different topology than the abstract pattern as it comprises the first nodes and links in addition to the second nodes and links added during the iteration.

In addition, or as an alternative, performing the second and/or a further one of the iterations comprises supplementing at least one second node of the previously generated intermediate pattern with one or more other second nodes, the at least one second node being incapable of enabling a deployment engine to instantiate the one or more resources represented by the at least one second node, each of said one or more other second nodes being capable or incapable of enabling the deployment engine to instantiate the one or more resources represented by the replaced second node.

In addition, or as an alternative, performing the second and/or a further one of the iterations comprises replacing at least one of the second nodes of the previously generated intermediate pattern by one or more other second nodes of the resource catalog. The replaced second node is incapable of enabling a deployment engine to instantiate the one or more resources represented by the replaced second node.

The one or more other second nodes are either capable or incapable of enabling a deployment engine to instantiate the one or more resources represented by the replaced second node. The at least one replaced second node may also be referred to as an "abstract second node", i.e., a second node incapable of enabling a deployment engine to instantiate the one or more resources represented by the second node. A second node capable of enabling a deployment engine to instantiate the one or more resources represented by the second node may be referred to as "concrete node". An iterative replacement of abstract second nodes by one or more concrete second nodes may be advantageous as iterative refinement of second nodes may eventually result in the generation of a concrete pattern comprising specific resource specifications that enable a deployment engine to automatically instantiate and/or control all resources of the target ITI capable of providing the runtime environment required by the application.

According to embodiments, if the one or more other second nodes are capable to enable instantiation, e.g. because they comprise specifications and interfaces for controlling the one or more resources represented by the at least one replaced second node, the one or more other second nodes may act as leafs which are not supplemented by any further second node during further iterations, if any. For example, the second nodes having been added to the abstract pattern or to a previously generated intermediate pattern may integrate additional edges and branches into the intermediate pattern generated as result of an iteration.

A second node which, alone or in combination with one or more other second nodes, replaces a particular second node is considered herein as a "more concrete version" of the replaced second node. If the particular second node is replaced by a single second, more concrete node, the topology of the resulting intermediate pattern will not change as a result of the replacement. It may also be the case that a number of second nodes is replaced by a different number of other second nodes during an iteration. If the number and/or connectivity of the replaced one or more second nodes differs from the number or connectivity of the set of one or more replacing nodes, the replacement operation may modify the topology of the resulting intermediate pattern. Thus, the topology of the intermediate patterns may smoothly, flexibly and fully automatically adapt to the particularities of the hardware and/or software resources available at a particular target IT-infrastructure. An intermediate pattern may comprise a graph of multiple interconnected first and second nodes with branches of different lengths, and some branches may be terminated by a leaf while other branches still do not contain a second node with instantiation capabilities. The iterations will be repeated until each branch is terminated by a leaf or if it is determined that at least one requirement corresponding to one of the non-leaf-branches cannot be fulfilled.

According to embodiments, the second nodes added in a first iteration for supplementing first nodes and first links of the abstract pattern represent modules of an application layer from which at least one functional module of the composite application depends. The second nodes added to a first one of the intermediate patterns in a second iteration for supplementing second nodes and second links of the first intermediate pattern may represent middleware components such as web application programs or application server programs which are used to host at least one functional module of the composite application or host another module from which the composite application depends. The second nodes added in a third iteration for supplementing second nodes and links of the second intermediate pattern may relate to database layer components such as one or more database management systems used for storing data generated or used by at least one functional module of the composite application or of one of the above mentioned application layer modules or middleware components. The second nodes used in a fourth iteration may relate to the operating system and/or to hardware resources such as routers, network cards, hard-discs, processors, card readers, firewalls etc. Thus, the abstract pattern may be iteratively supplemented with more details of the software, firmware and hardware resources available in the target ITI and whose capabilities meet the requirements of the first nodes and links and any additional requirements of the second nodes and links supplemented during the iterations.

According to embodiments, at least one of the first nodes of the abstract pattern is supplemented by one of the second nodes that has assigned additional requirements; the requirements inherited from the at least one first node and the additional requirements of the one second node are both inherited ("propagated down" to) in a further one of the iterations to another one of the second nodes. The other second node is, alone or in combination with additional second nodes, a more concrete version of the second node having assigned the additional requirements, the other second node being used during the following iteration for supplementing the one second node. This may be advantageous, because the inheritance, which may also be regarded as cumulative "down-propagation" of requirements during the iterations, ensures that any specification integrated into the abstract and intermediate patterns will fulfill the requirements of its direct parent node as well as the requirements of all its indirect parent nodes (i.e., parent nodes connected to the specification via two or more edges). No requirement information will be lost during the iterations. For example, a parent node, e.g. a first or second node, may have assigned a first requirement. When the parent node is supplemented by a further second node in a first iteration, the further second node may become a child node of the parent node and may automatically inherit the first requirement from its parent node. The further second node may have assigned a second requirement. If the further second node is supplemented or replaced in a still further iteration by a still further second node, the still further second node will become (in case of supplementation) a child node of the further second node and will (in case of supplementation as well as of replacement) inherit the first and the second requirement from the further second node.

According to embodiments, multiple second nodes contained in a resource catalog may meet the requirements of a particular second node having already been integrated into an intermediate pattern. In this case, the first one of the multiple second nodes in the catalog that was evaluated and that matches the requirements may be used for supplementing the abstract or intermediate pattern. In other embodiments, some rules may be executed for automatically selecting the one of the plurality of second nodes contained in the resource catalog, which provides the required capabilities in the cheapest or most reliable or the fastest manner.

According to embodiments, the target ITI is one of a plurality of candidate target IT-infrastructures ("CTITI"). Each of the CTITIs respectively comprises a resource catalog. The resource catalogs respectively comprise, for each resource available in the CTITI, a specification of the resource's capabilities and of the second nodes and links supported by the CTITI. Each of the second nodes is a representation of one or more of the resources of the CTITI and comprising an indication of the capabilities of the one or more resources represented by the second node. The method further comprises automatically performing, e.g. by the pattern composer, the iterative evaluation operation on the resource catalog of each of the CTITIs as described for any one of the above mentioned embodiments. Thereby each first node and link of the abstract pattern and the second nodes and links of the intermediate patterns are supplemented, if possible, by one or more of the second nodes of the resource catalog which comprise an indication of capabilities of the one or more resources represented by the one or more second nodes which meet all requirements assigned to the supplemented first node or first link. The iterations may be performed until each of the first resources and links of the abstract pattern is supplemented with a specification of a resource available in the CTITI and that meets all requirements inherited from the first node or link and from all the second nodes and links supplemented by the specification.

According to embodiments, the method comprises outputting, for each of the CTITIs, an indication of whether the repeated supplementations resulted in the generation of a concrete pattern comprising specifications of resources of the CTITI which meet all requirements inherited from the first and second nodes or links having meanwhile been integrated into the intermediate pattern generated for the CTITI.

In addition, or alternatively, the method comprises performing the repeated supplementations for each of the CTITIs for transforming the abstract pattern into an executable concrete pattern for each of the CTITIs, if possible. Thereby, in each concrete pattern each first node and first link of the abstract pattern is supplemented by one or more of the second nodes of the resource catalog of the CTITIs, the one or more of the second nodes comprising specifications of one or more of the resources of the CTITI which are represented by the one or more second nodes and which meet the requirements having been inherited directly or indirectly from the first nodes and first links. In addition, the method comprises executing, e.g. by a deployment engine interoperatively coupled to the pattern composer, one of the concrete patterns, thereby deploying the functional modules of the composite application in accordance with the one executed concrete pattern to the CTITI for which the concrete pattern was created.

In some embodiments, the user may be provided with some interface means for selecting one of the concrete patterns that shall be executed. Alternatively, the first concrete pattern that was created may be automatically selected and executed. This may be advantageous in the case of multiple CTITIs being available, the task of determining which one of them, if any, is able to host the composite application is greatly facilitated. A user does not have to specify a concrete pattern in detail for each of the CTITIs. Rather, a single abstract pattern is used as input for automatically determining for which one of the CTITIs a concrete pattern can be generated. One of the generated concrete patterns may be used for automatically deploying the composite application. In a redundant cloud environment, for example, the composite application may also be deployed to multiple CTITIs in parallel.

According to embodiments, the method comprises: in case it is determined that one of the CTITI lacks at least one resource required by the first nodes or first links of the abstract pattern, automatically terminating the repeated evaluation of the resource catalog of the CTITI and starting evaluating the resource catalog of another one of the CTITIs.

In addition, or alternatively, the method comprises skipping the evaluation of the resource catalogs of the other CTITIs and automatically deploying the composite application to the one CTITI in case it is determined that one of the CTITI comprises all resources required by the first nodes and first links of the abstract pattern. The features may help to increase the speed of identifying a suitable target ITI for deploying the composite application. CPU consumption may be reduced by skipping the evaluation of the other CTITIs.

According to embodiments, at least some of the first nodes and first links are supplemented with one or more of the second nodes and second links in a group-wise manner by supplementing the abstract pattern with a sub-pattern and by connecting the first nodes as parent nodes to the second nodes of the sub-pattern. The sub-pattern comprises the one or more second nodes.

In addition, or alternatively, first ones of the second nodes and second links of at least one intermediate pattern are supplemented with one or more further ones of the second nodes and links in a group-wise manner by supplementing the at least one intermediate pattern with a sub-pattern. The sub-pattern comprises the one or more further second nodes and links and by connecting the supplemented second nodes as parent nodes to the one or more further second nodes; the further nodes may be, for example, incapable of enabling a deployment engine to instantiate the resources represented by the second node.

In addition, or alternatively, second ones of the second nodes and second links of at least one intermediate pattern are replaced by one or more still further ones of the second nodes and links in a group-wise manner by replacing the second ones of the second nodes with a sub-pattern. The sub-pattern comprises the one or more still further second nodes and links. The still further nodes may be, for example, capable or incapable of enabling a deployment engine to instantiate the resources represented by the second node. Using sub-patterns may be advantageous as this may allow integrating sets of interconnected second nodes whereby the requirements of the one or more other second nodes and links can be specified and integrated as a complete and indivisible unit.

According to embodiments, the method further comprises creating the target ITI after the provisioning of the abstract pattern and before the provisioning of the resource catalog of the target ITI. Embodiments may allow creating the abstract pattern before the target ITI exists. According to embodiments, a new resource specification of an additional hardware component is automatically added to a resource catalog at the moment when the new hardware component is added to a particular target ITI.

In the following, like numbered elements in the figures either designate similar elements or designate elements that perform an equivalent function. Elements which have been discussed previously will not necessarily be discussed in later figures if the function is equivalent.

Figure 1:
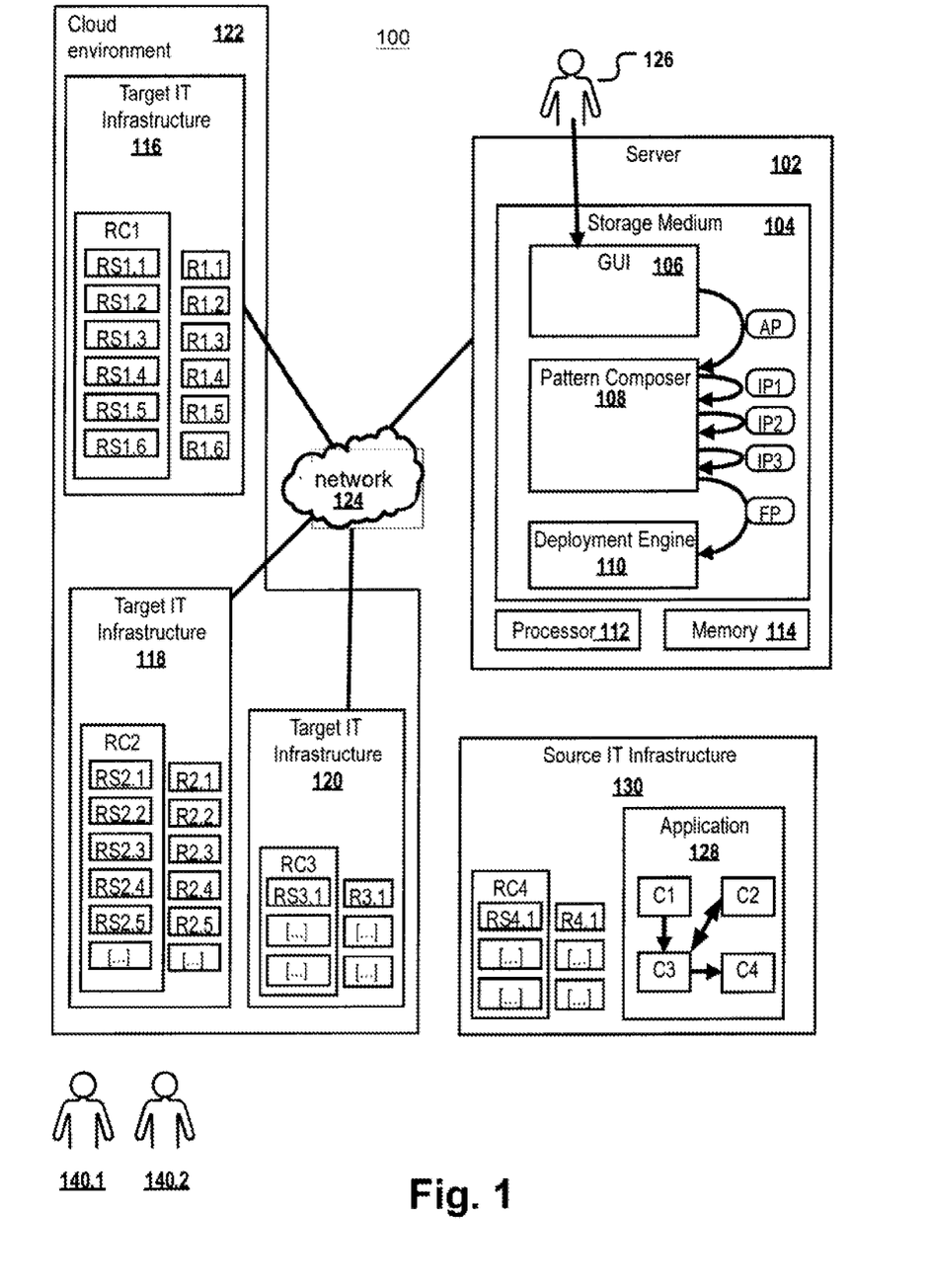
FIG. 1 illustrates a system used for deploying an application, in accordance with an aspect of the present invention.

FIG. 1 shows a system 100 used for deploying a composite application 128. The composite application is hosted by a source IT-infrastructure ("source ITI") 130 and comprises multiple functional modules C1-C4 connected to each other via communication links. For example, the functional module may be different functional components of a complex, composite web application hosted on one or more different application server programs. For example, functional module C1 may relate to the web-interface of the application 128, module C2 may relate to a cryptographic unit, module C3 to a database access logic and module C4 may relate to the user management of application 128. The composite application may be executed in a runtime environment ("RE") provided by resources of the source ITI 130 on many different levels. On the hardware level, for example, some hardware- and/or firmware based resources like network cards, switches, routers and the like may enable the application program to access a network 124. On a next level, some other hardware, firmware and/or software based resources like the operating system, a firewall or the like may provide some fundamental functionalities of the RE of application 128. On a further level, e.g. the middleware level, software components such as web server programs or application server programs may host the functional modules of the composite application program. A user, e.g. an admin of the system 100 may define an abstract pattern AP. The abstract pattern comprises a plurality of first nodes N1, N2 connected to each other via first links 202 as depicted in greater detail in FIG. 2. The source ITI may comprise a resource catalog RC4 which comprises, for each resource available in the source ITI 130, a specification RS4.x. For example, source ITI comprises resource R4.1 and a specification RS4.1 in the resource catalog RC4.

The system 100 comprises a server 102 with a processor 112, a non-volatile storage medium 104 and memory 114. The server comprises a user interface 106, e.g. a GUI, enabling a user 126 to specify an abstract pattern AP. The server 102 or another server connected to the network 124 comprises a deployment engine 110 that is operable to deploy the composite application 128 automatically, based on a pattern, to one or more target ITIs 116, 118, 120. However, as the abstract pattern AP lacks any data enabling the deployment engine 110 to instantiate or control a resource in order to provide a RE that supports the composite application 128, the deployment engine cannot use the abstract pattern for automated deployment at first hand. The server 102 may in addition comprise a pattern composer 108 that is operable to evaluate the abstract pattern and to supplement the abstract pattern with more detailed and concrete information on the resources which are available at a particular target ITI and which could provide a RE for the application 128. For supplementing the abstract pattern with the more concrete information, the pattern composer 108 has read access to the resource catalogs RC1, RC2, RC3 of each candidate (i.e. "potential") target ITI. For example, resource catalog RC1 may comprise a specification RS1.1 of a resource R1.1 of target ITI 116. Resource catalog RC2 may comprise a specification RS2.1 of a resource R2.1 of target ITI 118.

The pattern composer 108 is configured for iteratively supplementing the abstract pattern AP with more concrete information on the capabilities of the resources available at a particular target ITI. Thereby, in each iteration, an intermediate pattern IP1, IP2, IP3 is generated which comprises more details of the available resources at the target ITI. The details may comprise, for example, additional requirements, a device type, a software type, an installation path, configuration parameters, database access credentials or any other kind of information that may enable a deployment engine to automatically instantiate and/or control a resource of an IT-infrastructure. Finally, specifications of resources required for providing an appropriate RE are added to the intermediate pattern(s) for returning a concrete pattern FP in case all first and second nodes and links of a previously generated intermediate pattern IP3 could be supplemented with enough detail to allow automated instantiation of all resources necessary to provide a RE for the application 128. The generated concrete pattern FP may be forwarded from the pattern composer 108 to the deployment engine 110 to enable the deployment engine to automatically control the resources specified in the concrete pattern and for automatically deploying all functional modules of the composite application to the target ITI for which the concrete pattern was generated.

Figure 2:
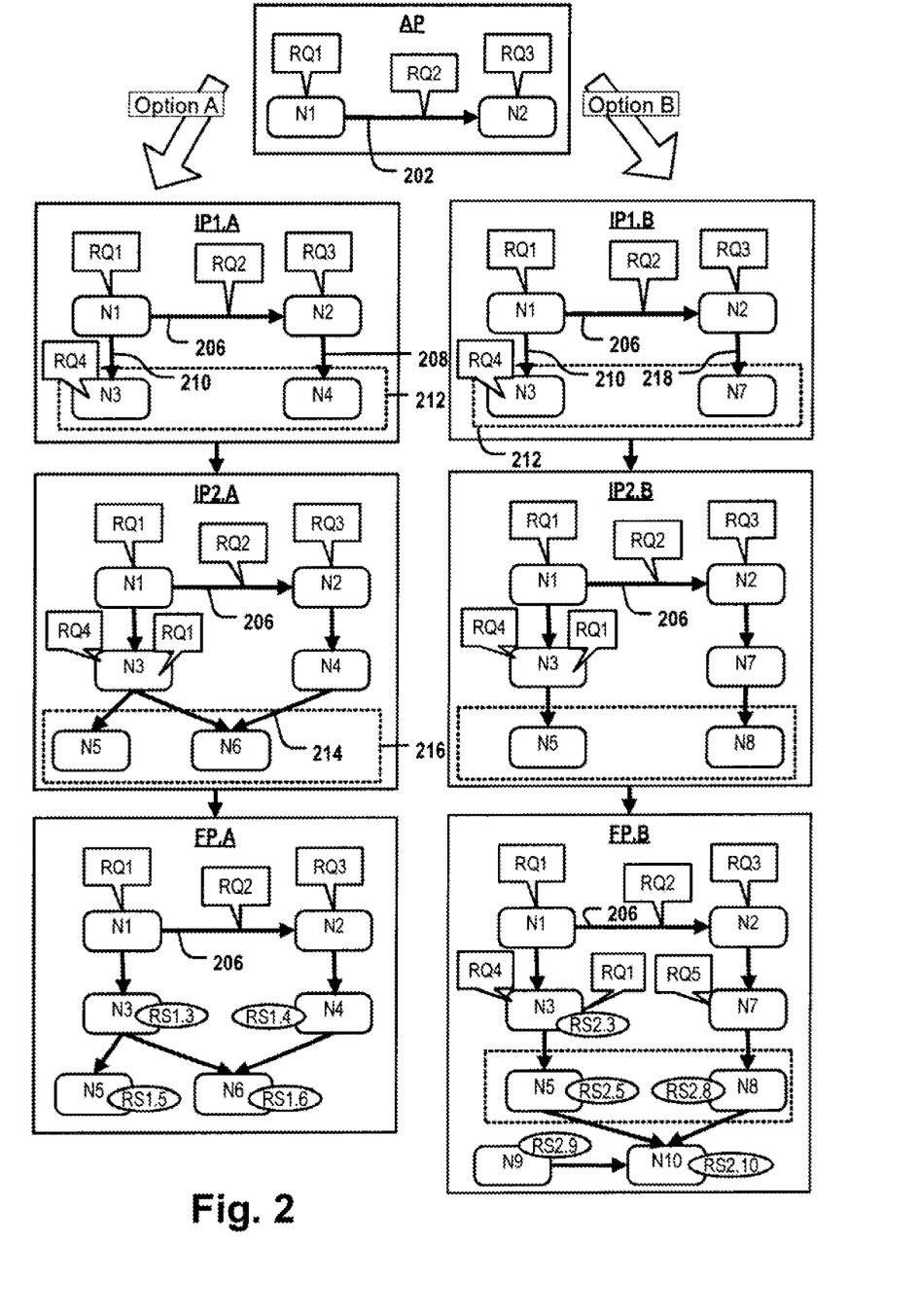
FIG. 2 illustrates alternatives for generating a concrete pattern, in accordance with an aspect of the present invention.

FIG. 2 illustrates two alternative pathways "A", "B" for generating a concrete pattern FP. At first, the user may have defined an abstract pattern AP lacking details necessary for instantiating required resources. The pattern may comprise first nodes N1, N2 connected to each other via a first link 202. Node N1 may have assigned requirement RQ1, node N2 may have assigned requirement RQ3 and communication link 202 may have assigned requirement RQ2. Each first node is a representation of one of the functional modules C1-C4 of the composite application 128. Each first link is a representation of a communication link between the modules. The first nodes and first links have assigned requirements RQ1-RQ3 in respect to a RE used for instantiating and/or operating the functional modules C1-C4 and the communication links. The abstract pattern AP lacks any reference to a resource R1.1-R1.5, R2.1-R2.5, R3.1-R3.n enabling a deployment engine 110 to instantiate the resource for providing the RE.

At first, an abstract pattern AP may be provided, e.g. by a developer of the composite application program 128 who does not have special knowledge of the resources available at a target ITI. Then, a resource catalog is specified for a particular target ITI, e.g. by one or more deployment architects 140 having special knowledge on the resources available at the hardware, middleware and/or application layer level of the target ITI. Then, the pattern composer 108 evaluates the resource catalog for automatically supplementing the first nodes and first links with the second nodes N3, N4 and second links representing resources whose capabilities meet the requirements RQ1-RQ3 assigned to the supplemented first nodes and links, thereby generating an intermediate pattern IP1 whose second nodes and links have inherited the requirements RQ1, RQ2, RQ3. The evaluation and automated supplementation is repeated by automatically supplementing the second nodes and second links of the intermediate pattern IP1-IP3 by further second nodes N5, N6, N7-N10 and further second links, until each first node and link is supplemented, if possible, by specifications RS1.1-RS1.5 of resources of the target IT-system whose capabilities meet requirements (e.g., all requirements) inherited from the first, second and further second nodes or links supplemented by the resources' specifications.

Option A: The pattern composer 108 may evaluate the resource catalog RC1 of target ITI 116 and supplement the first node N1 with a second node N3 that fulfills the requirement RQ1 assigned to N1. A further link 210 may be automatically generated that connects N1 and N3. First node N2 may be supplemented with a second node N4 that fulfills the requirement RQ3 assigned to N2. An additional link 208 is created that connects N2 and N4. The second nodes N3 and N4 may represent components of a middleware layer 212 acting as resources for providing parts of the RE. The second node N3 has assigned the additional requirement RQ4 and inherits the requirement RQ1 from the first node N1. Second node N4 has assigned no additional requirement but inherits the requirement RQ3 from the first node N2. By adding nodes N3 and N4, intermediate pattern IP1.A is generated.

In a next iteration, the pattern composer evaluating the resource catalog RC1 determines that requirements RQ4, RQ1 of node N3 are met by the capabilities of a combination of the two additional second nodes N5 and N6. All requirements of node N4 are met by second node N6. An additional link 214 may be generated. Second nodes N5 and N6 may belong to the hardware infrastructure layer and may represent network switches, routers, proxies and the like. By supplementing intermediate pattern IP1.A with the more detailed information associated with the second nodes N5 and N6, intermediate pattern IP2.A is generated. A plurality of additional IT operations may be executed which are not depicted here. The number of iterations may depend on the complexity of the abstract pattern, the number and type of requirements assigned to the first nodes, the complexity and type of the second nodes and second links stored in the resource catalog RC1 and thus may depend on the type and configuration of the available resources R1.1-R1.5 of target ITI 116 that is evaluated. Finally, a concrete pattern FP.A is generated that comprises specifications RS1.3-RS1.5 of resources available in the target ITI 116 which meet the requirements of all nodes and links contained in the concrete pattern FP.A.

Option B: the intermediate patterns IP1.B, IP2.B and the concrete pattern FP.B depicted on the right side of FIG. 2 illustrates the situation when the pattern composer 108 evaluates the resource catalog RC2 of target ITI 118 which may comprise different kinds of resources than ITI 116. Due to the differences which are also reflected in the resource catalog RC2, the first node N2 may be supplemented with second node N7 instead of N4. This may result in different kinds of intermediate patterns IP1.B, IP2.B and a different kind of concrete pattern FP.B comprising the specifications of different kinds of resources. Also, the topology of concrete pattern FP.A and FP.B and the number of iterations necessary until all required details for instantiating the RE are integrated into the concrete pattern may differ. Thus, although the same abstract pattern AP is used as input both for option A (executed for CTITI 116) and option B (executed for CTITI 118), different kinds of concrete patterns are generated without human intervention. Concrete pattern FP.A allows automated deployment to target ITI 116. Concrete pattern FP.B allows automated deployment to target ITI 118.

Figure 3:
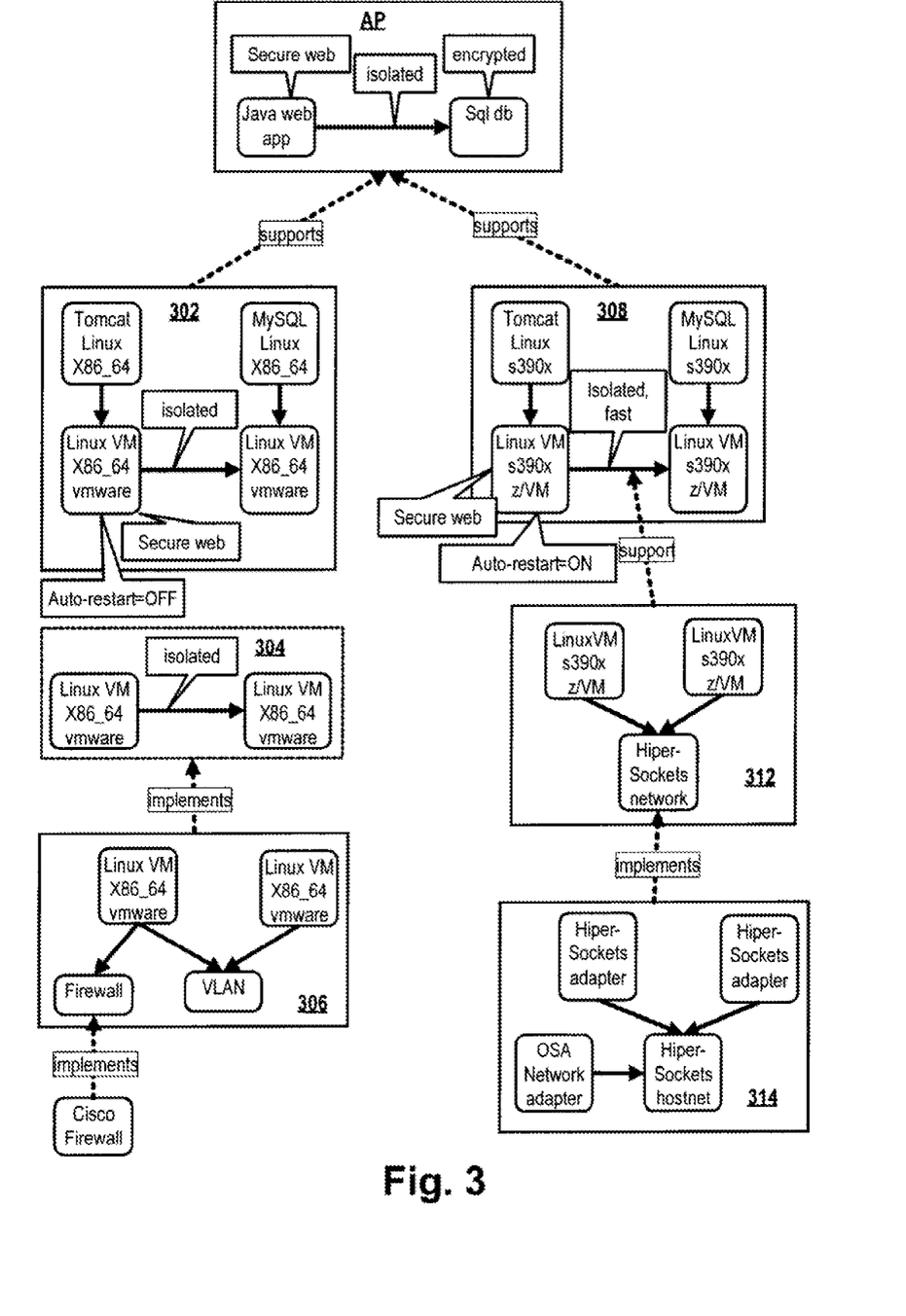
FIG. 3 illustrates the iterative supplementation of nodes and links, in accordance with an aspect of the present invention.

FIG. 3 illustrates the iterative supplementation of first and second nodes and links by other second nodes and links according to one embodiment. The abstract pattern and the intermediate pattern may be specified, for example, in the form of a YAML file using OASIS TOSCA language. The second nodes and links in the resource catalogs may be grouped into sub-patterns which may also be specified e.g. as YAML files or YAML file fragments. Second nodes, second links and/or sub-patterns comprising multiple second nodes and/or second links may respectively have assigned metadata. The metadata are indicative of the capabilities of the resources represented by the second nodes and second links in respect to providing a particular RE. That metadata may be evaluated by the pattern composer 108 to determine if a particular second node, second link and/or sub-pattern fulfills all requirements of a particular node or link or a set of nodes and links of the abstract pattern or of a previously generated intermediate pattern. The metadata may comprise, for example "supports"-statements and "implements"-statements.

A "supports" statement may indicate that a particular functional module C1-C4 which is represented by a particular first node can be hosted on one or more resources available at the target ITI and being represented by a second node and/or by a second link or by a group of multiple second nodes and/or second links whose metadata comprises the supports-statement in respect to the particular functional module. The second nodes or links or groups thereof may be contained in a sub-pattern. An "implements" statement may indicate that a particular second node, e.g. a second node that has not enough details to allow an instantiation of the resources represented by the second node, gets refined by an entity having assigned the "implements" statement. The entity may be a further second node and/or a further second link and/or a sub-pattern comprising one or more further second nodes and/or second links. The one or more further second nodes and links may constitute a more concrete version of the second nodes that gets refined. Like the "supports" statement, the "implements" statement may be part of the metadata assigned to some of the second nodes or second links or sub-patterns comprising the same that are stored in the resource catalog of a target ITI. Entities having assigned an "implements" statement will add more details for a particular second node contained in a previously generated intermediate pattern. Thus, supplementing the abstract pattern or an intermediate pattern by elements having assigned a "supports" statement may extend the topology of the abstract pattern or an intermediate pattern by additional second nodes which may represent one or more resources and which may or may not comprise enough details for enabling a deployment engine to instantiate the one or more resources. Supplementing an intermediate pattern with elements having assigned an "implements" statement will augment the pattern with more concrete details, e.g. by means of a replacement operation of second nodes for interactively replacing a second nodes with more concrete versions until a second node is integrated into the intermediate pattern that allows for an instantiation and/or control of the resource for setting up the RE for the application 128 at the target ITI.

A resource specification RS1.1-RS1.5 or "specification" may also have assigned an "implements" statement which indicates that the resource having assigned the resource specification implements an abstract resource type that may be represented by a second node within an abstract or intermediate pattern. The deployment engine is able to invoke concrete interfaces to manipulate and control the resource if the concrete pattern comprises a resource specification of the resource. When a new second node is added to an intermediate pattern, it may be connected to an existing node via a link having assigned the "implements" or "supports" statement of the metadata of the new second node. According to some embodiments, the interface used for controlling a resource is defined by an abstract resource type represented by a second node while the concrete resource specification provides the actual executables for the resource. In case the resource is a hardware device, the resource specification may comprise or act as a device driver.

The abstract pattern AP depicted in FIG. 3 may specify that a first node represents a Java web application and a second first node an SQL database (DB). The Java web application has assigned a requirement "secure web" which means that the web application should provide a secured web access. The SQL DB node has assigned the requirement "encrypted" meaning that the DB and its contents should be encrypted. The DB node may have assigned a database schema enabling the deployment engine to create the database according to that schema automatically. The communication link between the two first nodes has assigned the requirement "isolated" which means that the connection from the application to the database shall be isolated from other network traffic. The hosting infrastructure is not described in the abstract pattern AP. However, the nodes and links of the abstract pattern have assigned requirements indicated by RQ[X] that have to be fulfilled by second nodes and links which are available at a particular target ITI and which may be contained in one or more sub-patterns. There may exist two "sub-patterns" 302, 308 which respectively support the nodes, links and requirements of the abstract pattern AP. In some embodiments, both sub-patterns 302, 308 may be contained within the same resource catalog of a particular target ITI. In other embodiments, sub-pattern 302 may be stored in the resource catalog RC1 of a first target ITI 116 while sub-pattern 308 may be stored in the resource catalog RC2 of another target ITI 118.

For example, both sub-patterns 302, 308 comprise the additional information that the functional module represented by the "Java web app" first node will be hosted on a Tomcat application server and that the database represented by the first node "SQL db" will be hosted on a MySQL DBMS. Linux is a supported operating system by both target ITIs 116, 118. However, target ITI 116 may comprise X86_64 machines, while target ITI 118 may comprise s390x machines (i.e. IBM system z mainframes). The second nodes and sub-patterns stored in the resource catalogs RC1, RC2 of the respective infrastructures comprise different concrete details, properties and configuration data and may define different types of virtual machines, may define if and which kind of hypervisor to be used, and so on. The details and capabilities of the resources will be compared with the requirements of the nodes being already contained in the abstract and intermediate patterns to identify the second nodes that will be added to an intermediate pattern in a later iteration. For example, the second nodes may have assigned configuration data which may set a property of a resource to a particular value. For example, the configuration data could set an "auto-restart" property of a virtual machine or other component to true or false. Alternatively, the configuration data, e.g. the "auto-restart" value and the values of other requirement parameters, are calculated automatically by a pattern composer when iteratively generating the intermediate pattern, whereby the calculation takes one or more requirements of the first nodes or first links as input. For example, the "auto-restart=ON/OFF" may depend on the value of an "availability" parameter assigned to a first node or link and may in addition depend on the capabilities of the resources available at an ITI. The same requirement may result in the calculation of different parameter values acting as requirements of a second node when automatically calculating the configuration data for different resources. The property "auto-restart" may dynamically be set to "TRUE" during the iterations if a requirement of a first node requires that the Virtual Machine (VM) is highly available and if a second node representing a VMware Hypervisor is used to implement a first node or a more abstract second node "VM". If the property is set to "TRUE", the hypervisor component will monitor the state of the virtual machine and automatically restart it in case of an error. In this example, the type of the hypervisor is to support this restart control feature. On another hypervisor, the VMs might per default be highly available and be restarted without setting a special property, or the property might be called differently, or the second node representing the hypervisor may be refined in a further iteration e.g. by a second node representing a second hot-standby VM. Thus, a property or configuration parameter such as the "auto-restart" property may act as a requirement dynamically calculated and assigned to a second node during the iterations, whereby the calculation may be take as input requirements of the abstract pattern and from the specifications of the resources represented by the second nodes. Thus, the pattern composer 108 while executing the iterations may dynamically assign an additional requirement to one of the second nodes and may dynamically calculate the value of the requirement. The additional requirement may be a configuration property of a resource represented by the second node. In another example, the "secure-web" requirement is propagated down to ensure that the concrete application server program whose resource specification is finally integrated into the concrete pattern supports a secured web access. Similarly, the "encrypted" requirement is propagated down to the operating system level for enabling an encryption of the database on the file system level. The connection between the application and the database may be implemented as a network connection in the middleware layer. Thus, the requirements "isolated" may simply be propagated down from the application level of the first nodes to the second nodes representing resources of the middleware layer and having been added to an intermediate pattern during the iterations.

Sub-pattern 306 comprises two VM nodes as second nodes linked via second links to a VLAN node (Virtual LAN within a vmware hypervisor). Supplementing the second nodes representing the Linux Virtual Machines (VMs) with the nodes of sub-pattern 306 will enable a deployment engine to bind the VM hosting the Tomcat server to a VLAN at deployment time. If the network connection represented by the second link in sub-pattern 304 is indicated to be isolated, the VLAN will be freshly allocated when the Linux VM is deployed. As the first link within the abstract pattern AP comprises an "isolated" requirement that is propagated down during the iterations, also the link of the sub-pattern 304 will have assigned the "isolated" requirement. In case the Tomcat application server has assigned a requirement "secure web", an additional second node for a firewall supporting the requirement is added to an existing intermediate pattern. For example, a resource specification of a Cisco firewall may be added. The Tomcat application server node will inherit the requirement "secure web" from the first node "Java web application". Sub-patterns 312, 314 may be stored in the resource catalog of a target ITI 116, 118. Sub-pattern 312 may comprise second nodes and links specifying that two "Linux on system z" virtual machines (e.g., VMs running in a z/VM hypervisor and an IBM System z mainframe) can be connected with each other via a hipersockets-network, i.e., a very fast communication link for exchanging data between logical partitions of the main memory of a mainframe with the help of a hypervisor. If, for example, the second link of the sub-pattern 308 comprises the additional requirement that the data exchange between the two virtual machines hosting the Tomcat application server and the database should be very fast, sub-pattern 312 could be identified as a set of second nodes and links meeting the additional requirement. A sub-pattern 314 could specify properties of hardware and/or software components such as an OSA network adapter and could be added to the nodes and links contained in an intermediate pattern comprising sub-pattern 312.

A "pattern" or "deployment pattern" of an application as used herein is a specification of an IT-environment in which the application is supposed to be deployed to and is supposed to run. A pattern may be used repeatedly and may be used for deploying the application to one or more target ITIs meeting the requirements specified in the pattern provided the pattern comprises sufficiently detailed information. A "concrete pattern" may comprise executable rules and/or data enabling a deployment engine to install, instantiate and control all resources, which are specified in the pattern in the right chronological sequence. An "abstract pattern" is a pattern that lacks any resource-related data that would enable a deployment engine to instantiate the resource for providing a RE for the functional modules and communication links of a composite application. A "requirement" as used herein is a specification of one or more features that have to be fulfilled by a resource in order to provide a RE or a part of the RE for the application. The requirements may be, for example, a specification of a device type, an operating system type or version, a configuration parameter of a resource, a security requirement, a minimum performance or capacity requirement, or the like. A "composite application" refers to an application that comprises two or more functional modules that are configured to exchange some data at runtime. According to some embodiments, at least some of the functional modules may be deployed to different REs. For example, a composite application could consist of functional modules belonging to different layers of a multi-tier software architecture. According to another example, an individual application module may act as a first functional module and a database comprising some data to be processed by the module may act as a second functional module. A "communication link" is a coupling of at least two functional modules for exchanging information. A "first node" in an abstract pattern is a representation of one of the functional modules; a "first link" is a representation of one of the communication links of the composite application. Each first node and/or first link may have assigned zero, one or more requirements in respect to a RE used for instantiating and/or operating the functional modules and the communication links. A "resource specification" or "specification" is a description of a resource's capabilities of providing a RE with predefined functional and/or structural features, e.g. features that are required by the composite application or a functional module or communication link thereof. According to embodiments, the "specification" comprises enough information and/or an executable program logic enabling a deployment engine to control the resource. The control may in particular comprise the installation, instantiation, starting, stopping, restarting and/or configuring of the resource. A "second node", alone or in combination with additional second nodes or links contained in the same resource catalog, may represent one or more resources available in the ITI comprising the second node in its resource catalog. A second node used for supplementing a first node or first link may support the first node or link by providing an RE according to the requirements expressed by the first node or link. A second node may be abstract, meaning it does not provide sufficiently concrete information so that it can be instantiated by a deployment engine. Other "second nodes", alone or in combination with additional second nodes or links contained in the same resource catalog, may provide a more concrete version of an "abstract" second node. A second node is contained in the resource catalog of a target ITI in case the resource represented by the second node is available in the target ITI. That a second node is contained in the resource catalog of a target ITI thus indicates that the second node is supported by the resources of the target ITI, i.e., the second node represents a resource with some capabilities available in the ITI. By supplementing an abstract pattern with a second node supporting a first node defined in the abstract pattern, and by iteratively supplementing a resulting intermediate pattern with a second node being a more concrete version of an existing second node of the pattern, embodiments of the invention may create a concrete and executable deployment pattern for a particular target ITI automatically. A "more concrete" version of a second node (referred herein as the "more abstract" node) is a second node that may comprise additional information in respect to one or more resources represented by the second node available at a particular target ITI and meeting the requirements of the "more abstract" node. The additional information may be one or more of the following kinds of information: parameters for configuring a resource; the path to the resource; the path to execution logic or an interface for controlling the resource; a name or ID for identifying the resource; access credentials required for accessing the resource; the number and type of resources required for providing a required RE functionality. A "second link" is, alone or in combination with other second nodes or links, a more concrete version of one of the first links or of another second link. A second link being contained in the resource catalog of a target ITI represents a communication link that is supported by the resources of the target ITI. "Deployment" as used herein is the act of moving an application from a source ITI to a target ITI. The act of deploying an application at least comprises moving all functional modules of the application or a copy thereof to the target ITI. In addition, the act of deploying the application may comprise installing, configuring, and/or instantiating one or more of the resources available at the target ITI in a way to ensure that a RE is provided by the target ITI wherein the application can be executed correctly. An "IT-infrastructure" as used herein is the totality of hardware, firmware and software components available at a particular organization or organizational unit. A "resource" as used herein refers to a hardware-, firmware- or software component that provides or supports the provision of a RE for a composite application or for one or more functional modules of the application. For example, a resource could be a hardware and/or a firmware resource or a software resource of a middleware component, such as a particular database (MySQL, PostgreSQL, etc), a particular application server (JBoss, Tomcat, IBM WebSphere, etc).

As described herein, one aspect of the invention relates to a computer-implemented method for managing the deployment of a composite application. The composite application comprises multiple functional modules connected to each other via communication links. The computer-implemented method comprises:

Providing an abstract pattern comprising a plurality of first nodes. The first nodes are connected to each other via first links. Each first node is a representation of one of the functional modules. Each first link is a representation of one of the communication links. The first nodes and first links have assigned requirements in respect to a runtime environment used for instantiating and/or operating the functional modules and the communication links. The abstract pattern lacks resource-related data enabling a deployment engine to instantiate one or more resources for providing the runtime environment for the functional modules and communication links.

Providing a resource catalog of a target IT-infrastructure, the resource catalog comprising: for each resource of the target IT-infrastructure, a specification of the resource's capabilities to provide a runtime environment with predefined functional and/or structural features. In addition, the resource catalog comprises second nodes and second links. Each second node is a representation of one or more of the resources of the target IT-infrastructure and comprises an indication of the capabilities of the one or more resources represented by the second node. Each second link is, alone or in combination with additional second links or second nodes, a more concrete version of one of the first links or of another second link. Each second link in the resource catalog is supported by the resources of the target IT-infrastructure.

Iteratively evaluating the resource catalog for supplementing each first node of the abstract pattern with one or more of the second nodes and links. The iterations are repeated until each first node and first link is supplemented, if possible, with one or more of the second nodes which comprise an indication of capabilities of the one or more resources represented by the one or more second nodes which meet all requirements assigned to the supplemented first node or first link. For each of two or more of the iterations, an intermediate pattern is generated as a result of the iteration. In each iteration, the one or more second nodes and/or second links inherit all requirements assigned to the first nodes and links directly from the first nodes and links or indirectly from the first nodes and links via other second nodes and links, the other second nodes and links being already contained in the one of the intermediate patterns having generated in the previous iteration, the other second nodes having been added to the intermediate pattern for supplementing the first nodes and first links.

Another aspect of the invention relates to a storage medium comprising instructions which, when executed by a processor of a data processing system cause the processor to execute the method of any one of the embodiments described herein.

Another aspect of the invention relates to a computer system comprising a processor and a storage medium. The storage medium comprises instructions which, when executed by the processor, provide for a pattern composer. The pattern composer is operatively coupled a pattern composer being operatively coupled to a source IT-infrastructure and to one or more target IT-infrastructures, the source IT-infrastructure hosting a composite application comprising multiple functional modules connected to each other via communication links. Each of the target IT-infrastructures has assigned a resource catalog. The resource catalog comprises, for each resource available in the target IT-infrastructure, a specification of the resource's capabilities to provide a runtime environment with predefined functional and/or structural features, and comprises second nodes and second links. Each second node is, alone or in combination with additional second nodes and second links, a more concrete version of one of the first nodes or of another second node and is supported by the resources of the target IT-infrastructure. Each second link is, alone or in combination with additional second links or nodes, a more concrete version of one of the first links or of another second link. Each second link in the resource catalog and is supported by the resources of the target IT-infrastructure. The pattern composer is configured for executing, alone or in interoperation with a deployment engine, the method of any one of the embodiments described herein.

A 'computer-readable storage medium' or 'storage medium' as used herein encompasses any tangible storage medium which may store instructions which are executable by a processor of a computing device. The computer-readable storage medium may be a non-transitory storage medium. In some embodiments, a computer-readable storage medium may also be able to store data which is able to be accessed by the processor of the computing device. Examples of computer-readable storage media include, but are not limited to: a magnetic hard disk drive, a solid state hard disk, flash memory, a USB thumb drive, Random Access Memory (RAM), Read Only Memory (ROM), a magneto-optical disk, and the register file of the processor. Examples of optical disks include Compact Disks (CD) and Digital Versatile Disks (DVD). The term computer readable-storage medium also refers to various types of recording media capable of being accessed by the computer device via a network or communication link. For example, data may be retrieved over a modem, over the internet, or over a local area network. Computer executable instructions embodied on a computer readable medium may be transmitted using any appropriate medium, e.g. wireless, wireline, optical fiber cable, RF, etc. A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. 'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. A 'processor' encompasses an electronic component which is able to execute a program or machine executable instruction or computer executable code. References to the computing device comprising "a processor" should be interpreted as possibly containing more than one processor or processing core. The processor may for instance be a multi-core processor or may consist of a collection of processors. Computer executable instructions may comprise machine executable code causing a processor to perform an aspect of the present invention. The code may be written in one or more programming languages. Each block or a portion of any one of the figures can be implemented by computer program instructions in the form of computer executable code when applicable.

When not mutually exclusive, combinations of blocks in different flowcharts, illustrations, and/or block diagrams may be combined. These computer program instructions may be provided to a processor of a computer or data processing apparatus to produce a machine, such that the instructions, which execute via the processor of the computer or the data processing apparatus, create means for implementing the functions/acts specified in any block of any one of the figures. These instructions may also be stored in a computer readable medium that can direct a computer to function such that the instructions implement the function/act specified in any one of the blocks.

Aspects of the present invention may be embodied as an apparatus, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Aspects of the present invention may take the form of a computer program product embodied in one or more computer readable medium(s) having computer executable code embodied thereon. One or more of the aforementioned embodiments may be combined as long as the combined embodiments are not mutually exclusive.

What is claimed is:

1. A computer-implemented method of managing deployment of a composite application, the computer-implemented method comprising:
   providing an abstract pattern comprising a plurality of first nodes connected via one or more first links, wherein:
      a first node represents a functional module of the composite application, the composite application comprising multiple functional modules;
      a first link represents a communication link of one or more communication links connecting the multiple functional modules; and
      the abstract pattern lacks resource-related data enabling a deployment engine to instantiate one or more selected resources for providing a runtime environment for the multiple functional modules and the one or more communication links;
   providing a resource catalog of a target infrastructure, the resource catalog comprising:
      for one or more resources of said target infrastructure, a specification of one or more capabilities of the one or more resources to provide the runtime environment with predefined features; and
      a plurality of second nodes, wherein a second node is a representation of at least one resource of the one or more of the resources of the target infrastructure and comprising an indication of one or more capabilities of the at least one resource represented by said second node; and
   iteratively evaluating the resource catalog to supplement at least one first node of the abstract pattern with one or more second nodes of the plurality of second nodes.

2. The computer-implemented method of claim 1, wherein the plurality of first nodes and the one or more first links have assigned requirements in respect to the runtime environment used to instantiate the multiple functional modules and the one or more communication links.

3. The computer-implemented method of claim 1, wherein the plurality of first nodes and the one or more first links have assigned requirements in respect to the runtime environment used to operate the multiple functional modules and the one or more communication links.

4. The computer-implemented method of claim 1, wherein in one or more iterations of the iteratively evaluating an intermediate pattern is generated as a result of an iteration, and wherein in at least one iteration one or more second nodes inherit requirements assigned to one or more first nodes directly from said one or more first nodes or indirectly via one or more other second nodes, the one or more other second nodes being already contained in one of the intermediate patterns generated in a previous iteration.

5. The computer-implemented method of claim 1, wherein the resource catalog further comprises one or more second links, wherein a second link is used to provide a more concrete version of one first link of the one or more first links, the one or more second links being supported by the one or more resources of the target infrastructure.

6. The computer-implemented method of claim 5, wherein in one or more iterations of the iteratively evaluating an intermediate pattern is generated as a result of an iteration, and wherein in at least one iteration at least one second link inherits requirements assigned to at least one first link directly from said at least one first link or indirectly via one or more other second links, the one or more other second links being already contained in one of the intermediate patterns generated in a previous iteration.

7. The computer-implemented method of claim 1, further comprising:
   performing the iteratively evaluating to iteratively supplement one or more first nodes of the plurality of first nodes to transform the abstract pattern into an executable concrete pattern, wherein in the executable concrete pattern at least one first node of the abstract pattern is supplemented by one or more second nodes of the plurality of second nodes, said one or more second nodes comprising specifications of one or more chosen resources of the one or more resources of the target infrastructure which are represented by said one or more second nodes and which meet requirements having been inherited from said plurality of first nodes and said one or more first links; and
   executing the executable concrete pattern, thereby automatically deploying the multiple functional modules of the composite application in accordance with the executable concrete pattern to the target infrastructure.

8. The computer-implemented method of claim 7, wherein the executable concrete pattern comprises an interface for at least one resource of the one or more resources of the target infrastructure, the method further comprising:
   using one or more interfaces specified in the executable concrete pattern to automatically perform a function to enable the automatic deployment of the composite application to the target infrastructure.

9. The computer-implemented method of claim 8, wherein the method further comprises using one or more interfaces specified in the executable concrete pattern to automatically perform a function to enable an automatic instantiation or control of the composite application in the target infrastructure.

10. The computer-implemented method of claim 9, wherein the function is selected from a group consisting of: instantiate, start, stop, restart and configure one or more of the resources of the target infrastructure.

11. The computer-implemented method of claim 7, further comprising:
   based on deploying the composite application to the target infrastructure, receiving a notification that a first resource of the one or more resources of the target infrastructure is to be replaced by a second resource of the one or more resources, wherein said second resource differs from the first resource being replaced in one or more of the following features selected from a group consisting of: a version number of the first resource, a manufacturer of the first resource, a device type number of the first resource, and a number or type of patches having been applied to the first resource; and
   re-executing, in simulation mode, at least one of the following selected from a group consisting of: the providing the abstract pattern, the providing the resource catalog and the iteratively executing, wherein at least one selected first node of the plurality of first nodes is supplemented with at least one selected second node of the plurality of second nodes representing said second resource.

12. The computer-implemented method of claim 11, wherein the re-executing in simulation mode comprises transforming the abstract pattern into an updated concrete pattern, and based on none of the requirements having been inherited being violated, automatically replacing the executable concrete pattern with the updated concrete pattern.

13. A computer system for managing deployment of a composite application, the computer system comprising:
 a memory; and
 a processor in communication with the memory, wherein the computer system is configured to perform a method, said method comprising:
  providing an abstract pattern comprising a plurality of first nodes connected via one or more first links, wherein:
   a first node represents a functional module of the composite application, the composite application comprising multiple functional modules;
   a first link represents a communication link of one or more communication links connecting the multiple functional modules; and
   the abstract pattern lacks resource-related data enabling a deployment engine to instantiate one or more selected resources for providing a runtime environment for the multiple functional modules and the one or more communication links;
  providing a resource catalog of a target infrastructure, the resource catalog comprising:
   for one or more resources of said target infrastructure, a specification of one or more capabilities of the one or more resources to provide the runtime environment with predefined features; and
   a plurality of second nodes, wherein a second node is a representation of at least one resource of the one or more of the resources of the target infrastructure and comprising an indication of one or more capabilities of the at least one resource represented by said second node; and
  iteratively evaluating the resource catalog to supplement at least one first node of the abstract pattern with one or more second nodes of the plurality of second nodes.

14. The computer system of claim 13, wherein the plurality of first nodes and the one or more first links have assigned requirements in respect to the runtime environment used to instantiate the multiple functional modules and the one or more communication links.

15. The computer system of claim 13, wherein the plurality of first nodes and the one or more first links have assigned requirements in respect to the runtime environment used to operate the multiple functional modules and the one or more communication links.

16. The computer system of claim 13, wherein the resource catalog further comprises one or more second links, wherein a second link is used to provide a more concrete version of one first link of the one or more first links, the one or more second links being supported by the one or more resources of the target infrastructure.

17. A computer program product for managing deployment of a composite application, the computer program product comprising:
 a computer readable storage medium readable by a processing circuit and storing instructions for performing a method comprising:
  providing an abstract pattern comprising a plurality of first nodes connected via one or more first links, wherein:
   a first node represents a functional module of the composite application, the composite application comprising multiple functional modules;
   a first link represents a communication link of one or more communication links connecting the multiple functional modules; and
   the abstract pattern lacks resource-related data enabling a deployment engine to instantiate one or more selected resources for providing a runtime environment for the multiple functional modules and the one or more communication links;
  providing a resource catalog of a target infrastructure, the resource catalog comprising:
   for one or more resources of said target infrastructure, a specification of one or more capabilities of the one or more resources to provide the runtime environment with predefined features; and
   a plurality of second nodes, wherein a second node is a representation of at least one resource of the one or more of the resources of the target infrastructure and comprising an indication of one or more capabilities of the at least one resource represented by said second node; and
  iteratively evaluating the resource catalog to supplement at least one first node of the abstract pattern with one or more second nodes of the plurality of second nodes.

18. The computer program product of claim 17, wherein the plurality of first nodes and the one or more first links have assigned requirements in respect to the runtime environment used to instantiate the multiple functional modules and the one or more communication links.

19. The computer program product of claim 17, wherein the plurality of first nodes and the one or more first links have assigned requirements in respect to the runtime environment used to operate the multiple functional modules and the one or more communication links.

20. The computer program product of claim 17, wherein the resource catalog further comprises one or more second links, wherein a second link is used to provide a more concrete version of one first link of the one or more first links, the one or more second links being supported by the one or more resources of the target infrastructure.

* * * * *